(12) United States Patent
Moy et al.

(10) Patent No.: US 12,372,957 B2
(45) Date of Patent: Jul. 29, 2025

(54) SYSTEMS AND METHODS FOR THE REMOTE PILOTING OF AN ELECTRIC AIRCRAFT

(71) Applicant: BETA AIR, LLC, South Burlington, VT (US)

(72) Inventors: Nicholas Moy, South Burlington, VT (US); Collin Freiheit, Burlington, VT (US); Joshua E. Auerbach, Waterbury Center, VT (US)

(73) Assignee: BETA AIR LLC, South Burlington, VT (US)

( * ) Notice: Subject to any disclaimer, the term of this patent is extended or adjusted under 35 U.S.C. 154(b) by 107 days.

(21) Appl. No.: 18/200,284

(22) Filed: May 22, 2023

(65) Prior Publication Data
US 2023/0350404 A1    Nov. 2, 2023

Related U.S. Application Data

(63) Continuation-in-part of application No. 17/732,396, filed on Apr. 28, 2022, now Pat. No. 11,691,730.

(51) Int. Cl.
*G05D 1/00* (2024.01)
*B64C 39/02* (2023.01)

(52) U.S. Cl.
CPC .......... *G05D 1/0011* (2013.01); *B64C 39/024* (2013.01); *G05D 1/102* (2013.01)

(58) Field of Classification Search
CPC ....... B64C 39/024; B64C 13/16; B64C 13/20; B64C 29/00; B64C 29/0016; G05D 1/00; G05D 1/0011; G05D 1/0016; G05D 1/0022

See application file for complete search history.

(56) References Cited

U.S. PATENT DOCUMENTS

| | | |
|---|---|---|
| 5,067,674 A | 11/1991 | Heyche |
| 9,108,729 B2 | 8/2015 | Duggan |
| 9,412,278 B1 | 8/2016 | Gong |
| 9,766,622 B1 | 9/2017 | Yang |
| 10,001,776 B2 | 6/2018 | Rangarajan |
| 10,202,190 B2 | 2/2019 | Tao |
| 10,953,984 B2 | 3/2021 | Blake |
| 11,008,098 B2 | 5/2021 | Zhang |
| 11,077,937 B1 | 8/2021 | Bruell |
| 11,084,584 B2 | 8/2021 | Sloan |
| 11,353,890 B1 | 6/2022 | Auerbach |
| 11,358,730 B1 | 6/2022 | Freiheit |

(Continued)

OTHER PUBLICATIONS

Tabassum et al., "Dynamic Control Allocation between Onboard and Delayed Remote Control for Unmanned Aircraft System Detect-and-Avoid," arXiv:2103.07820v1, Mar. 2021, 30 pages.

(Continued)

*Primary Examiner* — Benjamin P Lee
(74) *Attorney, Agent, or Firm* — Lee & Hayes, P.C.

(57) ABSTRACT

A system and method for the remote piloting of an electric aircraft is illustrated. The system comprises a remote device located outside an electric aircraft, wherein the remote device is configured to receive a flight command input from a user and transmit the flight command input to a flight controller located on the aircraft. The flight controller is located inside the aircraft and configured to receive the flight command input from the remote device and enact the flight command autonomously as a function of the flight command input.

20 Claims, 9 Drawing Sheets

(56) References Cited

U.S. PATENT DOCUMENTS

| | | |
|---|---|---|
| 11,417,224 B1 | 8/2022 | Freiheit |
| 11,454,990 B1 | 9/2022 | List |
| 2005/0004723 A1 | 1/2005 | Duggan |
| 2016/0031554 A1 | 2/2016 | Eshkenazy |
| 2016/0236790 A1 | 8/2016 | Knapp |
| 2016/0297520 A1 | 10/2016 | Sada-Salinas |
| 2017/0108866 A1 | 4/2017 | Quinn |
| 2017/0233071 A1 | 8/2017 | Pilskalns |
| 2017/0269594 A1 | 9/2017 | Sydnor |
| 2017/0308100 A1 | 10/2017 | Iskrev |
| 2017/0349280 A1 | 12/2017 | Liao |
| 2018/0002011 A1 | 1/2018 | Mccullough |
| 2018/0002012 A1 | 1/2018 | Mccullough |
| 2018/0002013 A1 | 1/2018 | Mccullough |
| 2018/0002014 A1 | 1/2018 | Mccullough |
| 2020/0132841 A1 | 4/2020 | Lovering |
| 2020/0140079 A1 | 5/2020 | Campbell |
| 2020/0156785 A1 | 5/2020 | Gibboney |
| 2020/0354049 A1 | 11/2020 | Noppel |
| 2021/0053670 A1 | 2/2021 | Landry |
| 2021/0089134 A1 | 3/2021 | Tran |
| 2021/0120176 A1 | 4/2021 | Wang |
| 2021/0183255 A1 | 6/2021 | Van Tulder |
| 2021/0316847 A1 | 10/2021 | Predonu |
| 2021/0362851 A1 | 11/2021 | Mccullough |
| 2021/0362857 A1 | 11/2021 | Mccullough |
| 2022/0147066 A1 | 5/2022 | Choi |
| 2022/0169366 A1 | 6/2022 | Truong |
| 2022/0317706 A1 | 10/2022 | Moy |

OTHER PUBLICATIONS

Zafar et al., "Design and development of effective manual control system for unmanned air vehicle," 3rd International Conference on Computer Research and Development, Mar. 11-13, 2011, pp. 349-353.

SYSTEMS AND METHODS FOR THE REMOTE PILOTING OF AN ELECTRIC AIRCRAFT

CROSS-REFERENCE TO RELATED APPLICATIONS

This application is a continuation in part of Non-provisional application Ser. No. 17/732,396 filed on Apr. 28, 2022, and entitled "SYSTEMS AND METHODS FOR THE REMOTE PILOTING OF AN ELECTRIC AIRCRAFT," the entirety of which is incorporated herein by reference.

FIELD OF THE INVENTION

The present invention generally relates to the field of electric aircrafts. In particular, the present invention is directed to a system and method for the remote piloting of an electric aircraft.

BACKGROUND

Having the ability to control an electric aircraft remotely allows the reduction of risk for the pilot and passengers, saves weight on the aircraft, and increases aircraft's ability to tolerate wider environmental ranges.

SUMMARY OF THE DISCLOSURE

In an aspect, a system for remote piloting of an electric vertical take-off and landing aircraft (eVTOL) is illustrated. The system comprises a remote device located outside and communicatively connected to the eVTOL, wherein the remote device comprises at least a pilot input configured to receive a flight command input from a user and the remote device is configured to transmit the flight command input to a flight controller located on the eVTOL, wherein flight command input configures the flight controller to enact a flight command autonomously as a function of the flight command input and receive at least a sensor input from the flight controller.

In another aspect, a method for the remote piloting of an electric vertical take-off and landing aircraft (eVTOL) is illustrated. The method includes locating a remote device outside and communicatively connected to the eVTOL, wherein the remote device comprises at least a pilot input configured to receive a flight command input from a user, transmitting, at the remote device, the flight command input to a flight controller located on the eVTOL, wherein the flight command input configures the flight controller to enact a flight command autonomously as a function of the flight command input.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
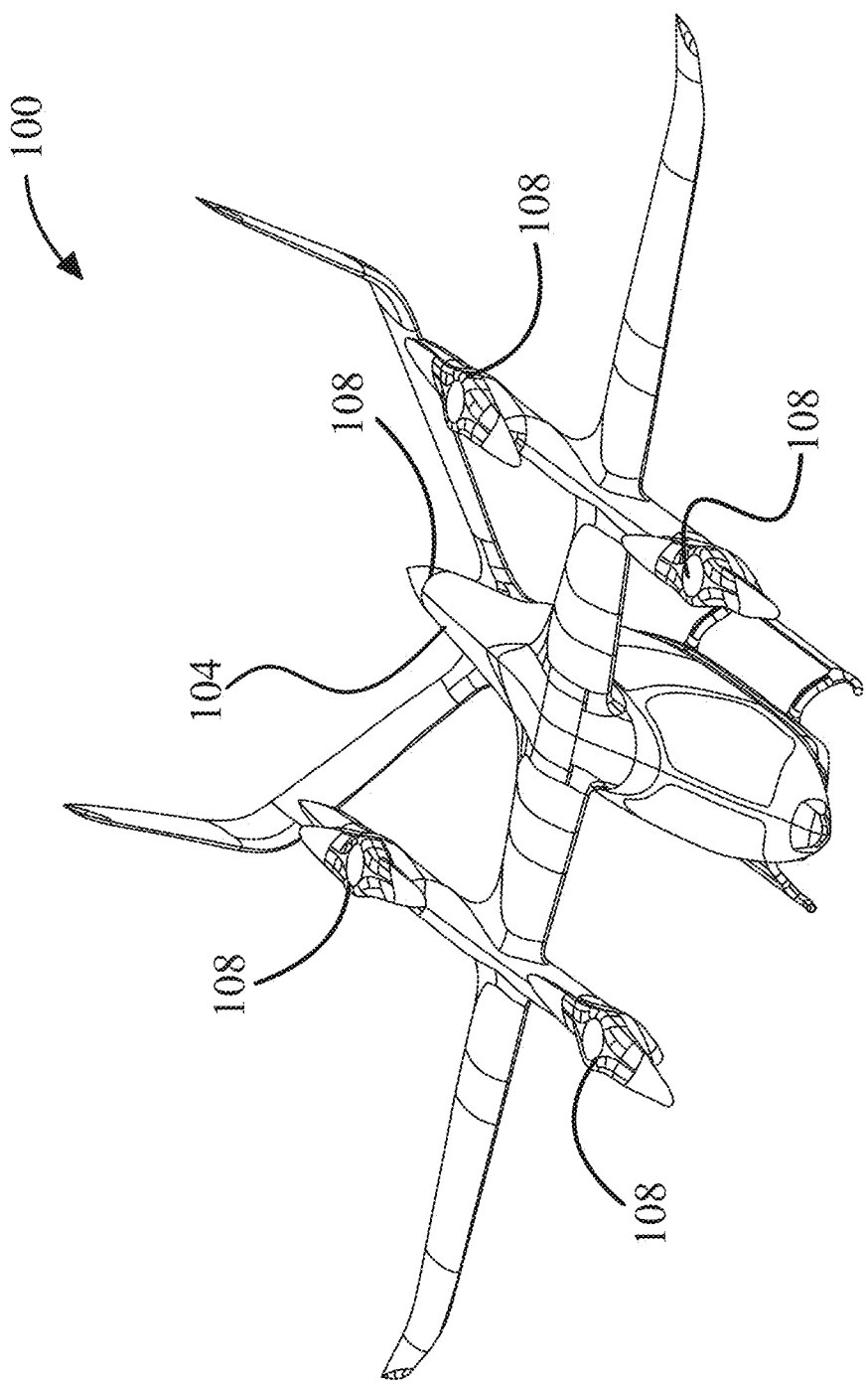
FIG. 1 is a diagrammatic representation of an exemplary embodiment of an electric aircraft.

Referring now to FIG. 1, an exemplary embodiment of an aircraft 100 is illustrated. In an embodiment, aircraft 100 is an electric aircraft. As used in this disclosure an "aircraft" is any vehicle that may fly by gaining support from the air. As a non-limiting example, aircraft may include airplanes, helicopters, commercial and/or recreational aircrafts, instrument flight aircrafts, drones, electric aircrafts, airliners, rotorcrafts, vertical takeoff and landing aircrafts, jets, airships, blimps, gliders, paramotors, and the like. Aircraft 100 may include an electrically powered aircraft. In embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. Electric aircraft may include one or more manned and/or unmanned aircrafts. Electric aircraft may include one or more all-electric short takeoff and landing (eSTOL) aircrafts. For example, and without limitation, eSTOL aircrafts may accelerate plane to a flight speed on takeoff and decelerate plane after landing. In an embodiment, and without limitation, electric aircraft may be configured with an electric propulsion assembly. Electric propulsion assembly may include any electric propulsion assembly as described in U.S. Nonprovisional application Ser. No. 16/603,225, filed on Dec. 4, 2019, and entitled "AN INTEGRATED ELECTRIC PROPULSION ASSEMBLY," the entirety of which is incorporated herein by reference.

Still referring to FIG. 1, aircraft 100, may include a fuselage 104 and flight component 108 (or one or more flight components 108).

As used in this disclosure, a vertical take-off and landing (VTOL) aircraft is an aircraft that can hover, take off, and land vertically. An eVTOL, as used in this disclosure, is an electrically powered aircraft typically using an energy source, of a plurality of energy sources to power aircraft. To optimize the power and energy necessary to propel aircraft 100, eVTOL may be capable of rotor-based cruising flight, rotor-based takeoff, rotor-based landing, fixed-wing cruising flight, airplane-style takeoff, airplane style landing, and/or any combination thereof. Rotor-based flight, as described herein, is where the aircraft generates lift and propulsion by way of one or more powered rotors or blades coupled with an engine, such as a "quad-copter," multi-rotor helicopter, or other vehicle that maintains its lift primarily using downward thrusting propulsors. "Fixed-wing flight", as described herein, is where the aircraft is capable of flight using wings and/or foils that generate lift caused by the aircraft's forward airspeed and the shape of the wings and/or foils, such as airplane-style flight.

Still referring to FIG. 1, as used in this disclosure a "fuselage" is a main body of an aircraft, or in other words, the entirety of the aircraft except for a cockpit, nose, wings, empennage, nacelles, any and all control surfaces, and generally contains an aircraft's payload. Fuselage 104 may include structural elements that physically support a shape and structure of an aircraft. Structural elements may take a plurality of forms, alone or in combination with other types. Structural elements may vary depending on a construction type of aircraft such as without limitation a fuselage 104. Fuselage 104 may include a truss structure. A truss structure may be used with a lightweight aircraft and includes welded steel tube trusses. A "truss," as used in this disclosure, is an assembly of beams that create a rigid structure, often in combinations of triangles to create three-dimensional shapes. A truss structure may alternatively include wood construction in place of steel tubes, or a combination thereof. In embodiments, structural elements may include steel tubes and/or wood beams. In an embodiment, and without limitation, structural elements may include an aircraft skin. Aircraft skin may be layered over the body shape constructed by trusses. Aircraft skin may include a plurality of materials such as plywood sheets, aluminum, fiberglass, and/or carbon fiber, the latter of which will be addressed in greater detail later herein.

In embodiments, and with continued reference to FIG. 1, aircraft fuselage 104 may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 104 orthogonal to a longitudinal (nose to tail) axis of the aircraft and may form a general shape of fuselage 104. A former may include differing cross-sectional shapes at differing locations along fuselage 104, as the former is the structural element that informs the overall shape of a fuselage 104 curvature. In embodiments, aircraft skin may be anchored to formers and strings such that the outer mold line of a volume encapsulated by formers and stringers includes the same shape as aircraft 100 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be attached to underlying stringers and formers and may interact with a fluid, such as air, to generate lift and perform maneuvers.

In an embodiment, and still referring to FIG. 1, fuselage 104 may include and/or be constructed using monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may include aircraft skin made from plywood layered in varying grain directions, epoxy-impregnated fiberglass, carbon fiber, or any combination thereof.

According to embodiments, and further referring to FIG. 1, fuselage 104 may include a semi-monocoque construction. Semi-monocoque construction, as used herein, is a partial monocoque construction, wherein a monocoque construction is describe above detail. In semi-monocoque construction, aircraft fuselage 104 may derive some structural support from stressed aircraft skin and some structural support from underlying frame structure made of structural elements. Formers or station frames can be seen running transverse to the long axis of fuselage 104 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction", vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 1, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may include aluminum, aluminum alloys, graphite epoxy composite, steel alloys, titanium, or an undisclosed material alone or in combination.

In an embodiment, and still referring to FIG. 1, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 104. Monocoque includes only structural skin, and in that sense, aircraft skin undergoes stress by applied aerodynamic fluids imparted by the fluid. Stress as used in continuum mechanics may be described in pound-force per square inch ($lbf/in^2$) or Pascals (Pa). In semi-monocoque construction stressed skin may bear part of aerodynamic loads and additionally may impart force on an underlying structure of stringers and formers.

Still referring to FIG. 1, it should be noted that an illustrative embodiment is presented only, and this disclosure in no way limits the form or construction method of a system and method for loading payload into an eVTOL aircraft. In embodiments, fuselage 104 may be configurable based on the needs of the eVTOL per specific mission or objective. The general arrangement of components, structural elements, and hardware associated with storing and/or moving a payload may be added or removed from fuselage 104 as needed, whether it is stowed manually, automatedly, or removed by personnel altogether. Fuselage 104 may be configurable for a plurality of storage options. Bulkheads and dividers may be installed and uninstalled as needed, as well as longitudinal dividers where necessary. Bulkheads and dividers may be installed using integrated slots and hooks, tabs, boss and channel, or hardware like bolts, nuts, screws, nails, clips, pins, and/or dowels, to name a few. Fuselage 104 may also be configurable to accept certain specific cargo containers, or a receptable that can, in turn, accept certain cargo containers.

Still referring to FIG. 1, aircraft 100 may include a plurality of laterally extending elements attached to fuselage 104. As used in this disclosure a "laterally extending element" is an element that projects essentially horizontally from fuselage, including an outrigger, a spar, and/or a fixed wing that extends from fuselage. Wings may be structures which may include airfoils configured to create a pressure differential resulting in lift. Wings may generally dispose on the left and right sides of the aircraft symmetrically, at a point between nose and empennage. Wings may include a plurality of geometries in planform view, swept swing, tapered, variable wing, triangular, oblong, elliptical, square, among others. A wing's cross section geometry may include an airfoil. An "airfoil" as used in this disclosure is a shape specifically designed such that a fluid flowing above and below it exert differing levels of pressure against the top and bottom surface. In embodiments, the bottom surface of an aircraft can be configured to generate a greater pressure than does the top, resulting in lift. Laterally extending element may include differing and/or similar cross-sectional geometries over its cord length or the length from wing tip to where wing meets aircraft's body. One or more wings may be symmetrical about aircraft's longitudinal plane, which includes the longitudinal or roll axis reaching down the center of aircraft through the nose and empennage, and plane's yaw axis. Laterally extending element may include controls surfaces configured to be commanded by a pilot or pilots to change a wing's geometry and therefore its interaction with a fluid medium, like air. Control surfaces may include flaps, ailerons, tabs, spoilers, and slats, among others. The control surfaces may dispose on the wings in a plurality of locations and arrangements and in embodiments may be disposed at the leading and trailing edges of the wings, and may be configured to deflect up, down, forward, aft, or a combination thereof. An aircraft, including a dual-mode aircraft may include a combination of control surfaces to perform maneuvers while flying or on ground.

Still referring to FIG. 1, aircraft 100 may include a plurality of flight components 108. As used in this disclosure a "flight component" is a component that promotes flight and guidance of an aircraft. In an embodiment, flight component 108 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling may include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof. In an embodiment, mechanical coupling may be used to connect the ends of adjacent parts and/or objects of an electric aircraft. Further, in an embodiment, mechanical coupling may be used to join two pieces of rotating electric aircraft components.

Still referring to FIG. 1, plurality of flight components 108 may include at least a lift propulsor. As used in this disclosure a "propulsor" is a component and/or device used to propel a craft upward by exerting force on a fluid medium, which may include a gaseous medium such as air or a liquid medium such as water. Propulsor may include any device or component that consumes electrical power on demand to propel an electric aircraft in a direction or other vehicle while on ground or in-flight. For example, and without limitation, propulsor may include a rotor, propeller, paddle wheel and the like thereof. In an embodiment, propulsor may include a plurality of blades. As used in this disclosure a "blade" is a propeller that converts rotary motion from an engine or other power source into a swirling slipstream. In an embodiment, blade may convert rotary motion to push the propeller forwards or backwards. In an embodiment propulsor may include a rotating power-driven hub, to which are attached several radial airfoil-section blades such that the whole assembly rotates about a longitudinal axis. The lift propulsor is further described herein with reference to FIG. 2.

In an embodiment, and still referring to FIG. 1, plurality of flight components 108 may include one or more power sources. As used in this disclosure a "power source" is a source that that drives and/or controls any other flight component. For example, and without limitation power source may include a motor that operates to move one or more lift propulsor components, to drive one or more blades, or the like thereof. A motor may be driven by direct current (DC) electric power and may include, without limitation, brushless DC electric motors, switched reluctance motors, induction motors, or any combination thereof. A motor may also include electronic speed controllers or other components for regulating motor speed, rotation direction, and/or dynamic braking. In an embodiment, power source may include an inverter. As used in this disclosure an "inverter" is a device that changes one or more currents of a system. For example, and without limitation, inverter may include one or more electronic devices that change direct current to alternating current. As a further non-limiting example, inverter may include receiving a first input voltage and outputting a second voltage, wherein the second voltage is different from the first voltage. In an embodiment, and without limitation, inverter may output a waveform, wherein a waveform may include a square wave, sine wave, modified sine wave, near sine wave, and the like thereof.

Still referring to FIG. 1, power source may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which aircraft 100 may be incorporated.

In an embodiment, and still referring to FIG. 1, an energy source may be used to provide a steady supply of electrical power to a load over the course of a flight by a vehicle or other electric aircraft. For example, the energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, the energy source may be capable of providing sufficient electrical power for auxiliary loads including without limitation, lighting, navigation, communications, de-icing, steering or other systems requiring power or energy. Further, the energy source may be capable of providing sufficient power for controlled descent and landing protocols, including, without limitation, hovering descent or runway landing. As used herein the energy source may have high power density where the electrical power an energy source can usefully produce per unit of volume and/or mass is relatively high. The electrical power is defined as the rate of electrical energy per unit time. An energy source may include a device for which power that may be produced per unit of volume and/or mass has been optimized, at the expense of the maximal total specific energy density or power capacity, during design. Non-limiting examples of items that may be used as at least an energy source may include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 1, an energy source may include a plurality of energy sources, referred to herein as a module of energy sources. The module may include batteries connected in parallel or in series or a plurality of modules connected either in series or in parallel designed to deliver both the power and energy requirements of the application. Connecting batteries in series may increase the voltage of at least an energy source which may provide more power on demand. High voltage batteries may require cell matching when high peak load is needed. As more cells are connected in strings, there may exist the possibility of one cell failing which may increase resistance in the module and reduce the overall power output as the voltage of the module may decrease as a result of that failing cell. Connecting batteries in parallel may increase total current capacity by decreasing total resistance, and it also may increase overall amp-hour capacity. The overall energy and power outputs of at least an energy source may be based on the individual battery cell performance or an extrapolation based on the measurement of at least an electrical parameter. In an embodiment where the energy source includes a plurality of battery cells, the overall power output capacity may be dependent on the electrical parameters of each individual cell. If one cell experiences high self-discharge during demand, power drawn from at least an energy source may be decreased to avoid damage to the weakest cell. The energy source may further include, without limitation, wiring, conduit, housing, cooling system and battery management system. Persons skilled in the art will be aware, after reviewing the entirety of this disclosure, of many different components of an energy source.

Still referring to FIG. 1, plurality of flight components 108 may include a pusher component. As used in this disclosure a "pusher component" is a component that pushes and/or thrusts an aircraft through a medium. As a non-limiting example, pusher component may include a pusher propeller, a paddle wheel, a pusher motor, a pusher propulsor, and the like. Additionally, or alternatively, pusher flight component may include a plurality of pusher flight components. Pusher component may be configured to produce a forward thrust. As used in this disclosure a "forward thrust" is a thrust that forces aircraft through a medium in a horizontal direction, wherein a horizontal direction is a direction parallel to the longitudinal axis. For example, forward thrust may include a force of 1145 N to force aircraft to in a horizontal direction along the longitudinal axis. As a further non-limiting example, pusher component may twist and/or rotate to pull air behind it and, at the same time, push aircraft 100 forward with an equal amount of force. In an embodiment, and without limitation, the more air forced behind aircraft, the greater the thrust force with which aircraft 100 is pushed horizontally will be. In another embodiment, and without limitation, forward thrust may force aircraft 100 through the medium of relative air. Additionally or alternatively, plurality of flight components 108 may include one or more puller components. As used in this disclosure a "puller component" is a component that pulls and/or tows an aircraft through a medium. As a non-limiting example, puller component may include a flight component such as a puller propeller, a puller motor, a tractor propeller, a puller propulsor, and the like. Additionally, or alternatively, puller component may include a plurality of puller flight components.

Figure 2:
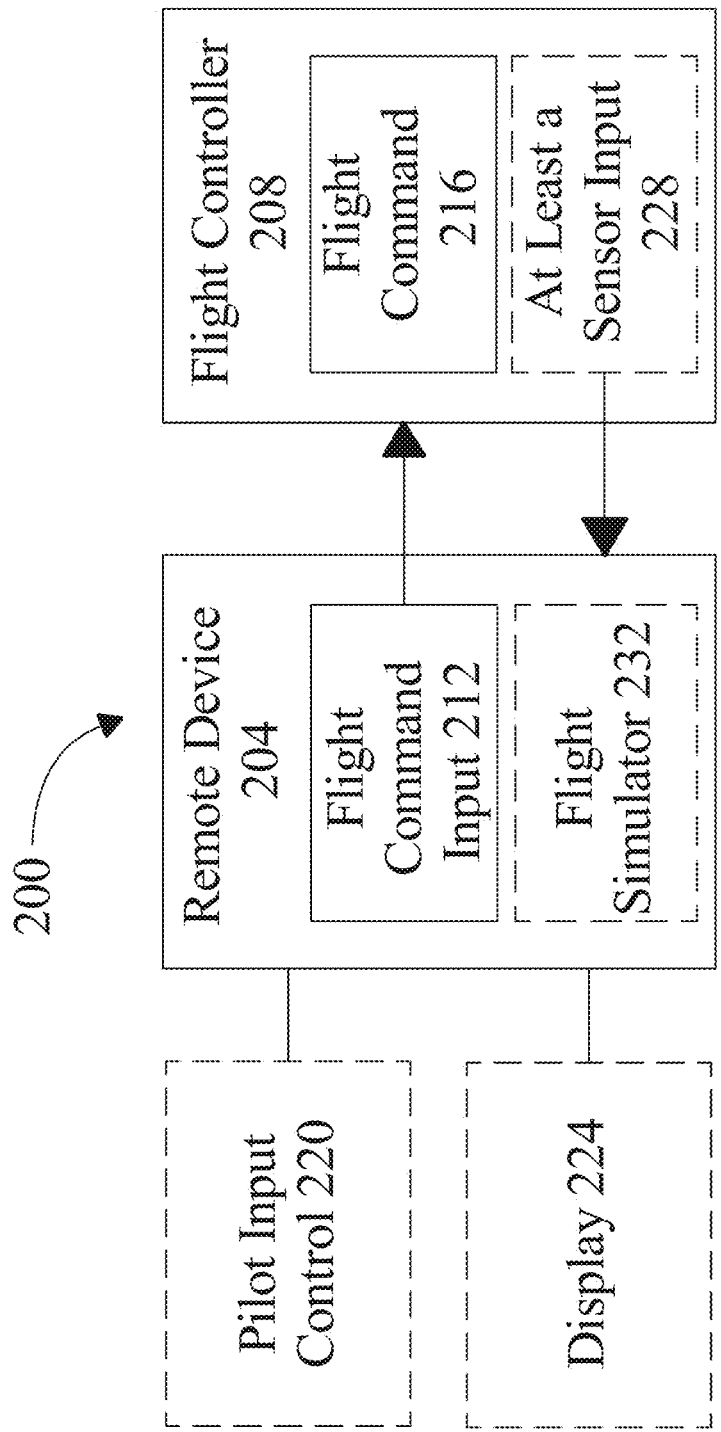
FIG. 2 is a block diagram of an exemplary embodiment of a system for remote piloting of an electric aircraft.

Now referring to FIG. 2, a system for the remote piloting of an electric aircraft is illustrated. System 200 includes remote device 204, flight command input 212, flight controller 208, flight command 216, pilot input control 220, display 224, at least a sensor input 228, and flight simulator 232. In this disclosure, "remote" insinuates a system that is outside of the aircraft. Pilot system may be located at a ground station or anything other location that is not inside the aircraft. "Remote piloting" means that the plane is controlled from a remote device located outside of the aircraft.

Still referring to FIG. 2, system 200 includes a remote device 204 located outside of the electric aircraft. As used in this disclosure "remote device" is an electronic device connected to another device in another location and is able to send signals between the other device and the remote device. Remote device 204 is an external device to a flight controller. For example, but without limitation, remote device 204 may include display 224, such as without limitation a "heads up" display, augmented reality display, projected screen, computer screen, VR goggles, a tablet, a phone, a gaming device or the like. Other examples may include various types of displays including but not limited to electroluminescent display (ELD), a liquid crystal display (LCD), a light-emitting diode (LED), a plasma display (PDP), and/or a quantum dot display (QLED). Other displays may include a head mounted display, a heads-up display, a display incorporated in eyeglasses, googles, headsets, helmet display systems, or the like, a display incorporated in contact lenses, an eye tap display system including without limitation a laser eye tap device, VRD, or the like. Remote device 204 and display 224 may be implemented as any of the remote devices or displays explained in in U.S. Nonprovisional application Ser. No. 17/524,355, filed on Nov. 11, 2021, and entitled "SYSTEMS AND METHODS FOR SIMULATING AN ELECTRICAL VERTICAL TAKEOFF AND LANDING (EVTOL) AIRCRAFT," the entirety of which is incorporated herein by reference. Display 224 may be configured to virtually display a pilot view of the electric aircraft during a flight simulation, wherein data associated with the flight simulation such as, without limitation, flight command input, sensor input, flight component specific data, and the like as described in further detail below in this disclosure. Remote device 204 may be connected to flight controller or attached to some sort of pilot control, as long as it is separate from the flight controller in the aircraft. Remote device 204 may also be a stereoscopic display, which may denote a display that simulates a user experience of viewing a three-dimensional space and/or object, for instance by simulating and/or replicating different perspectives of a user's two eyes; this is in contrast to a two-dimensional image, in which images presented to each eye are substantially identical, such as may occur when viewing a flat screen display. Stereoscopic display may display two flat images having different perspectives, each to only one eye, which may simulate the appearance of an object or space as seen from the perspective of that eye. Alternatively or additionally, stereoscopic display may include a three-dimensional display such as a holographic display or the like. Since aircraft 100 is controlled through remote device 204, remote device 204 includes a plurality of flight simulator components that are a duplicate of the flight simulator components located inside aircraft 100. Remote device includes a computing device, which is further explained below in reference to FIG. 6. Persons skilled in the art, upon reviewing the entirety of this disclosure, will be aware of various optical projection and/or remote device 204 technologies that may be incorporated in system 200 consistently with this disclosure. Remote device is a type of computing device that is further explained herein in reference to FIGS. 3 and 6.

Still referring to FIG. 2, remote device 204 may include a pilot input control 220. In this disclosure "pilot input control" is a system a user occupies to control the aircraft by inputting inputs. Pilot input control 220 may include input using a throttle lever, inceptor stick, collective pitch control, steering wheel, brake pedals, pedal controls, toggles, joystick. One of ordinary skill in the art, upon receiving the benefit of this disclosure in its entirety, may appreciate the variety of pilot input controls 220 that may be present in an electric aircraft consistent with the present disclosure. For instance and without limitation, inceptor stick may be consistent with disclosure of inceptor stick in U.S. patent application Ser. No. 17/001,845 and titled "A HOVER AND THRUST CONTROL ASSEMBLY FOR DUAL-MODE AIRCRAFT", which is incorporated herein by reference in its entirety. In further non-limiting illustrative examples, a collective pitch control may be consistent with disclosure of collective pitch control in U.S. patent application Ser. No. 16/929,206 and titled "HOVER AND THRUST CONTROL ASSEMBLY FOR DUAL-MODE AIRCRAFT", which is incorporated herein by reference in its entirety. Pilot input control 220 may be physically located within the aircraft or located remotely outside the aircraft in a second location communicatively connected to at least a portion of the aircraft Still referring to FIG. 2, flight simulator 232 is configured to receive at least a sensor input 228 from flight controller 208 and simulate flight of electric aircraft 100 as a function of at least a sensor input 228. In this disclosure, "flight simulator" is a machine designed to resemble the cockpit of an aircraft, with computer-generated images that mimic the pilot's view. In this disclosure, a "sensor input" is a piece of data information, received from various sensors, concerning an input from a component of a flight simulator, which is further explained below in reference to FIG. 3. In some cases, sensors may include, without limitation, an inertial measurement sensor/unit, an analog sensor, a digital sensor, a thermometer, a pressure sensor, a humidity sensor, a torque sensor, a gyroscope, an accelerometer, a magnetometer, a force sensor, a proximity sensor, a displacement sensor, a vibration sensor, a Hall sensor, and the like. In an embodiment, one or more sensors listed above may be communicatively connected to flight controller 208; for instance, and without limitation, flight controller 208 may be configured to receive and/or process one or more electrical signals (analog or digital) transmitted by the one or more sensors. In a non-limiting example, sensors may be configured to monitor a plurality of parameters (i.e., sensor input 228) such as, airspeed, altitude, pitch, roll, yaw, temperature, pressure, and the like. Additionally, or alternatively, at least a sensor input 228 may be virtually generated to accurately represent real-world conditions (i.e., physical conditions of the environment which the eVTOL operates) that eVTOL would experience during actual flight. Such at least a sensor input 228 may be processed and/or utilized in further processing steps as described below in this disclosure. In a non-limiting example, once remote device 204 receives this at least a sensor input 228 from flight controller 208, it then will use components also described in FIG. 3, such as projectors, to show the simulated flight result.

With continued reference to FIG. 2, at least a sensor input 228 may include flight component specific data. As used in this disclosure, "flight component specific data" refers to the data related to each individual flight component of the eVTOL. Flight component may include any flight component as described in this disclosure. In an embodiment, flight component specific data may be essential for monitoring, at flight controller 208 and/or remote device 204, status and performance of flight components of the eVTOL. Flight component specific data may include any sensor input as described above. In some cases, flight component specific data may include at least an electrical system parameter. As used in this disclosure, at least an "electrical system parameter" refers to a specific characteristics (e.g., properties, measurements, quantities, or the like) that describe a behavior, a performance, or otherwise a state of one or more electrical system within the eVTOL. In a non-limiting example, electrical system parameter may include a battery charge level, rate of charge or discharge, temperature, overall health of one or more batteries configured to provide electrical energy for the eVTOL. Such electrical system parameter may be collected by one or more sensors connected to one or more batteries of the eVTOL such as, without limitation, voltage sensor, current sensor, power sensor, resistance sensor and/or the like.

Still referring to FIG. 2, in an embodiment, flight component specific data may include data related to one or more propellers/propulsors and components related to the one or more propellers/propulsors. In a non-limiting example, flight component specific data may include lifter health data, wherein the "lifter health data," for the purpose of this disclosure, are information collected to access that status, performance, and overall health of a "lift" generating flight components (e.g., propellers) of the eVTOL. In some cases, lifter health data may include, without limitation, propeller RPM (i.e., how fast propellers are spinning), propeller vibration, performance under load (i.e., how lifters perform when the eVTOL is carrying a payload or operating under challenging conditions such as high winds or high altitudes), and any data that may identify potential problems related to one or more lift generating flight components of the eVTOL during flight. In another non-limiting example, flight component specific data may include pusher health data, wherein the "pusher health data," for the purpose of this disclosure, are information collected to access the status, performance, and overall health of a "thrust" generating flight components (e.g., propulsor) of the eVTOL. It should be noted that, thrust generating flight component and lift generating flight component may be refer to a same flight component of the eVTOL, wherein the eVTOL may be capable of performing a transition (i.e., moves from hover to conventional flight or vice versa) during flight as described in further detail below. In some cases, pusher/lifter health data may include motor health data such as, without limitation, motor temperature, rotor vibration, motor speed and/or torque, motor current and/or voltage input, motor insulation resistance, motor start up time, motor run time, and/or the like.

Referring to FIG. 2, remote device 204 is configured to receive a flight command input 212 from a user. As used in this disclosure, a "flight command input" is an element of information received from a user that tells aircraft 100 to enact a specific maneuver, or aircraft adjustment. Flight command input 212 is received from a user, which is a pilot. Flight command input 212 may be any type of interaction between the user and the remote device 204. Flight command input 212 includes an altitude adjustment. In this disclosure, "altitude adjustment" is the suggested change in height, or altitude of the electric aircraft. Flight command input 212 includes a change of flight mode. In this disclosure, a first method of flying and a second method of flying are distinct "flight modes" where the first method uses a different source of lift from the second component; a change of flight mode may include, without limitation, a change from hovering and/or rotor-based flight to fixed wing flight or the like. Flight command input 212 may receive input from user through standard I/O interface such as ISA (Industry Standard Architecture), PCI (Peripheral Component Interconnect) Bus, and the like. Flight command input 212 may receive input from user through standard I/O operation. In one embodiment, flight command input 212 may further receive input from user through optical tracking of motion. In one embodiment, flight command input 212 may further receive input from user through voice-commands. Flight command input 212 may further use event-driven programming, where event listeners are used to detect input from user and trigger actions based on the input. Flight command input 212 may include a desired torque applied to one or more propulsors based on a user input. Flight command input 212 may include data about torque, power, direction, acceleration and/or deceleration. Flight command input 212 may indicate a pilot's desire to change the heading or trim of an electric aircraft. Flight command input 212 may indicate a pilot's desire to change an aircraft's pitch, roll, yaw, or throttle. Aircraft trajectory is manipulated by one or more control surfaces and propulsors working alone or in tandem consistent with the entirety of this disclosure, hereinbelow. "Pitch", for the purposes of this disclosure refers to an aircraft's angle of attack, that is the difference between the aircraft's nose and the horizontal flight trajectory. For example, an aircraft pitches "up" when its nose is angled upward compared to horizontal flight, like in a climb maneuver. In another example, the aircraft pitches "down", when its nose is angled downward compared to horizontal flight, like in a dive maneuver. When angle of attack is not an acceptable input to any system disclosed herein, proxies may be used such as pilot controls, remote controls, or sensor levels, such as true airspeed sensors, pitot tubes, pneumatic/hydraulic sensors, and the like. "Roll" for the purposes of this disclosure, refers to an aircraft's position about its longitudinal axis, that is to say that when an aircraft rotates about its axis from its tail to its nose, and one side rolls upward, like in a banking maneuver. "Yaw", for the purposes of this disclosure, refers to an aircraft's turn angle, when an aircraft rotates about an imaginary vertical axis intersecting the center of the earth and the fuselage of the aircraft. "Throttle", for the purposes of this disclosure, refers to an aircraft outputting an amount of thrust from a propulsor. Flight command input 212, when referring to throttle, may refer to a pilot's desire to increase or decrease thrust produced by at least a propulsor. Flight command input 212 may include an electrical signal. Flight command input 212 may include mechanical movement of any throttle consistent with the entirety of this disclosure. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal.

Still referring to FIG. 2, remote device 204 is configured to transmit the flight command input 212 to a flight controller 208 located inside the aircraft. In this disclosure, a "flight controller" is a computing device of a plurality of computing devices dedicated to data storage, security, distribution of traffic for load balancing, and flight instruction. Remote device 204 is communicatively connected to flight controller 208 so it can transmit the flight controller input 212. Flight controller 208 may include and/or communicate with any computing device as described in this disclosure, including without limitation a microcontroller, microprocessor, digital signal processor (DSP) and/or system on a chip (SoC) as described in this disclosure. Flight controller 208 is further described herein with reference to FIG. 3. Flight controller 208 is configured to receive the flight command input 212 from the remote device 204.

Still referring to FIG. 2, flight command input 212 configures flight controller 208 to enact a flight command 216 autonomously as a function of flight command input 212. In this disclosure, "flight command" is an aircraft adjustment and/or maneuver that a user tells the aircraft to perform through the flight command input 212. Flight command is the actual action that flight command datum 212 contains the information of. In an embodiment, and without limitation, flight command may be one or more adjustments and/or modifications relating to a pitch angle of aircraft. Flight command is performed automatically once flight command input 212 is received by flight controller 208. For example, and without limitation, flight command may denote that a pitch angle of 2° above a horizon reference should be adjusted to 7° above a horizon reference as a function of one or more actuators acting on an aileron. In another embodiment, and without limitation, flight command may include one or more adjustments and/or modifications relating to a position of a propeller blade and/or rotor of aircraft. For example, and without limitation, flight command may denote that variable pitch angle of a propeller blade and/or rotor should be modified from a first angle of 2.71° to a second angle of 3.82° as a function of a linear actuator. Additionally or alternatively, and without limitation, flight command may include a modification of an aircraft's altitude, thrust, forward thrust, reverse thrust, airspeed velocity, groundspeed velocity, heading direction, pitch angle, approach angle, angle of attack, torque, and the like thereof.

Flight controller 208 is further configured to identify an aircraft location before enacting flight command. Signal strength from one or more transmitters/repeaters/relays, automatic dependent surveillance broadcast (ADS-B) or similar location reporting, direct communication of position on an intended or projected flight path. Flight command may be any action that a user, usually a pilot, desires aircraft to perform. Flight command is enacted as a function of the flight command input since it describes the actual flight command the user wishes the aircraft to perform. Flight command is enacted by the flight controller 208 located on aircraft 100.

Figure 3:
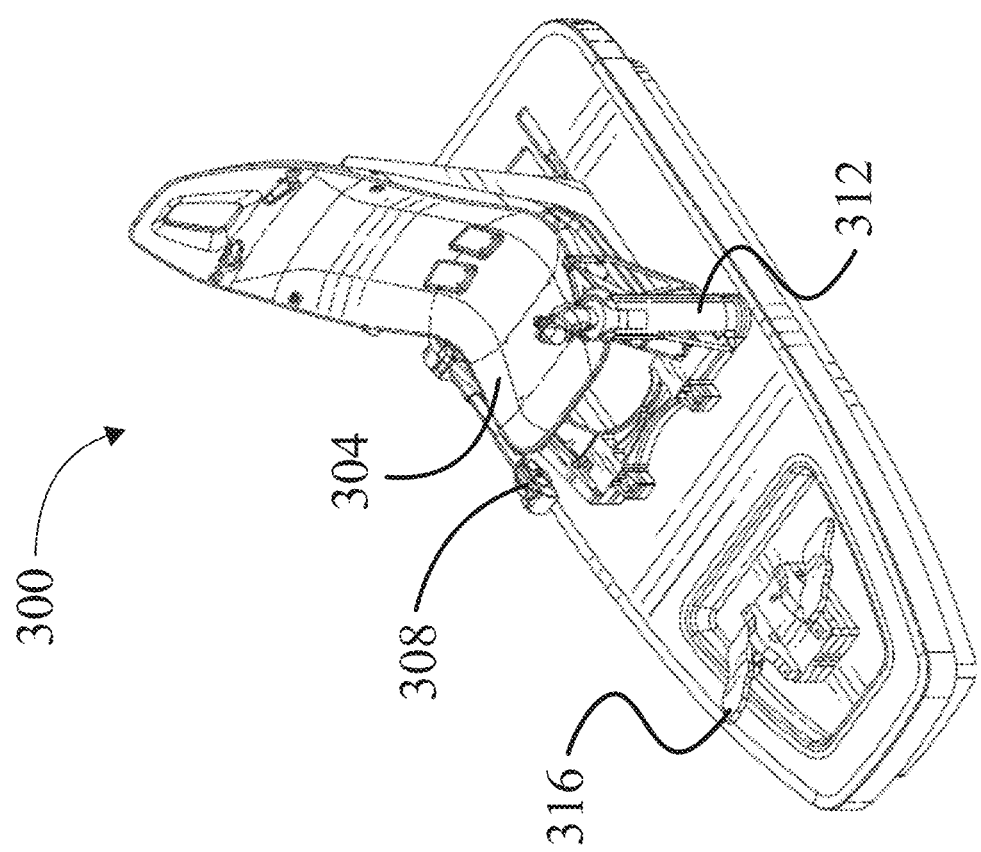
FIG. 3 is an exemplary embodiment of a possible simulator seat.

Now referring to FIG. 3, an exemplary embodiment of a possible simulator seat, or virtual reality seat, is illustrated. System 300 includes seat 304, collective 308, inceptor stick 312, and pedals 316. Both collective 308 and inceptor stick 312 imitate any collective or inceptor stick described in U.S. Nonprovisional application Ser. No. 16/929,206, filed on Jul. 15, 2020, and entitled "A HOVER AND THRUST CONTROL ASSEMBLY FOR DUAL-MODE AIRCRAFT," the entirety of which is incorporated herein by reference. Seat 304 is the physical chair in which the user resides while controlling flight simulator. Pedals 316 may control yaw or break the acceleration of aircraft 100.

Figure 4:
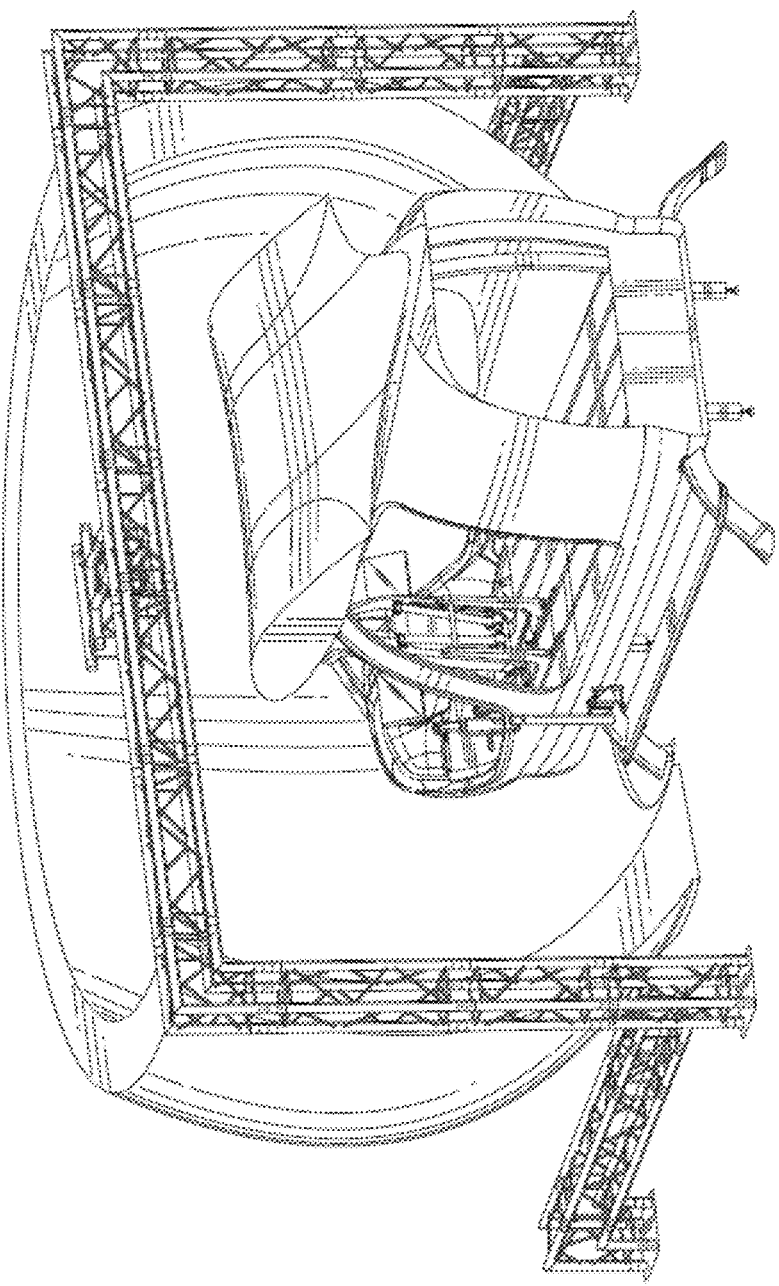
FIG. 4 is an exemplary embodiment of a possible simulator.

Now referring to FIG. 4, an exemplary embodiment of a possible simulator is presented. The flight simulator illustrated here is categorized as a Thunderdome flight simulator, which enables multiple crew training missions and allows spectators to sit in the airframe; other types of simulators that may be reflected by this disclosure include Micro domes, a virtual reality seat as explained in reference to FIG. 3, traditional full motion, etc. Mobile flight simulator explained in this disclosure may be any of the flight simulators explained here or in U.S. Nonprovisional application Ser. No. 17/524,355, filed on Nov. 11, 2021, and entitled "SYSTEMS AND METHODS FOR SIMULATING AN ELECTRICAL VERTICAL TAKEOFF AND LANDING (EVTOL) AIRCRAFT," the entirety of which is incorporated herein by reference.

Figure 5:
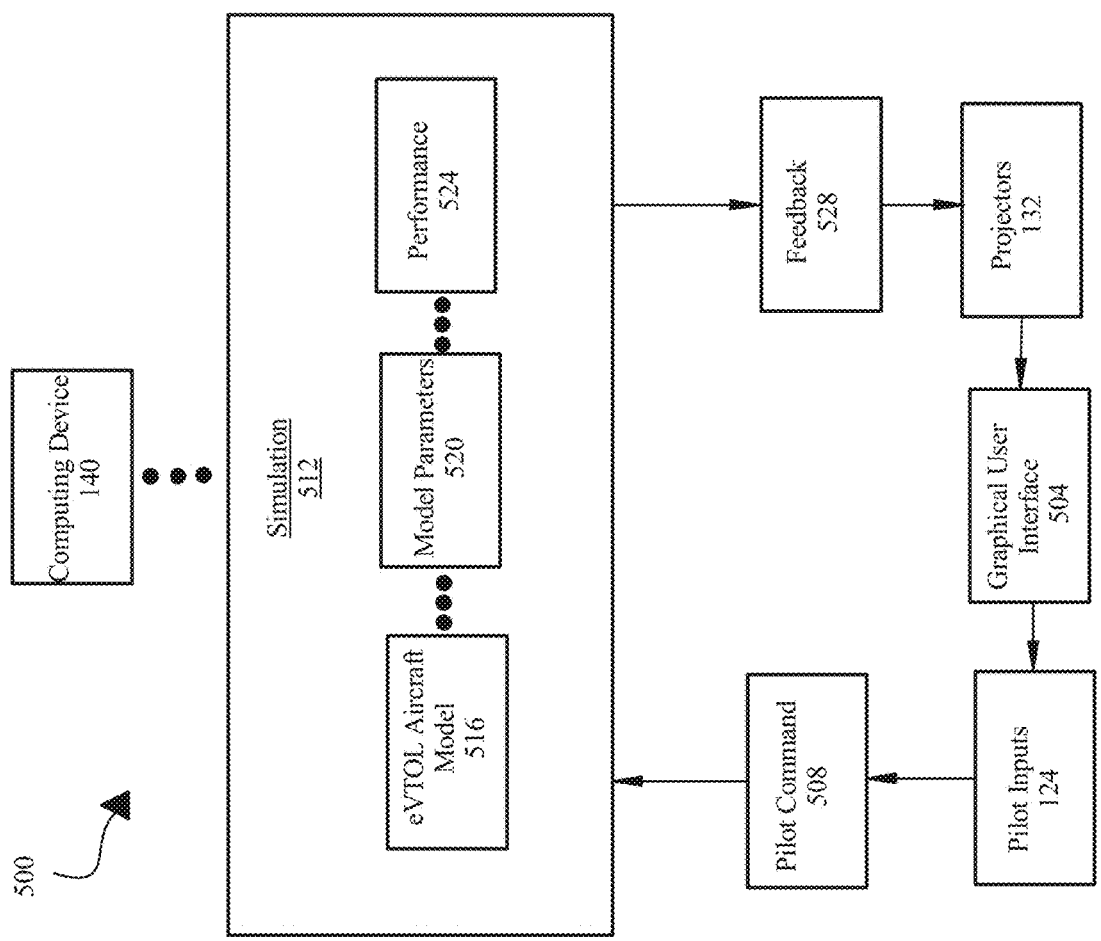
FIG. 5 is a block diagram illustrating an exemplary embodiment of a system for flight simulation of an eVTOL aircraft.

With continued reference to FIG. 5, pilot command 508 may be configured to be sent to computing device 140. Computing device 140 may be configured to generate a simulation 512. For example, and without limitation, computing device 140 may include one or more devices capable of modeling, simulating, analyzing, and the like thereof a multidomain system. Computing device 140 may be configured to generate an eVTOL aircraft model 516. As used in this disclosure a "model" is a representation and/or graphical image denoting an artificial and/or virtual aircraft in flight. In an embodiment, and without limitation, eVTOL aircraft model 516 may denote an environment in which the artificial and/or virtual aircraft flies. In some cases, eVTOL aircraft model 516 may include one or more physics models, which represent analytically or through data-based, such as without limitation machine-learning processes, one or more physical phenomena. One or more physical phenomena may be associated with an aircraft and/or an environment. For example, some versions of eVTOL aircraft model 516 may include thermal models representing aircraft components by way of thermal modeling. Additionally or alternatively, eVTOL model 516 may include one or more aerodynamics models, inertial models, mass models, propeller models, pusher motor models, Euler models, sensor models, battery models, and the like thereof. In an embodiment, and without limitation, sensor models may denote one or more representations of injecting noise, failed sensors, white noise potential, transfer functions, and the like thereof. In another embodiment, battery models may denote one or more estimation algorithms, power capabilities, thermal outputs, power capabilities, and the like thereof. In another embodiment, eVTOL model 516 may include a simple path and/or a variant path. As used in this disclosure a "simple path" is a less complex algorithm that allows for a faster simulation. In an embodiment, and without limitation, simple path may denote a fast simulation, wherein the enhanced speed reduces the accuracy of eVTOL aircraft model 516. As used in this disclosure a "variant path" is a more complex algorithm that allows for a slower simulation. In an embodiment, and without limitation, variant path may denote a slow simulation, wherein the reduced speed enhances the accuracy of eVTOL model 516.

Figure 6:
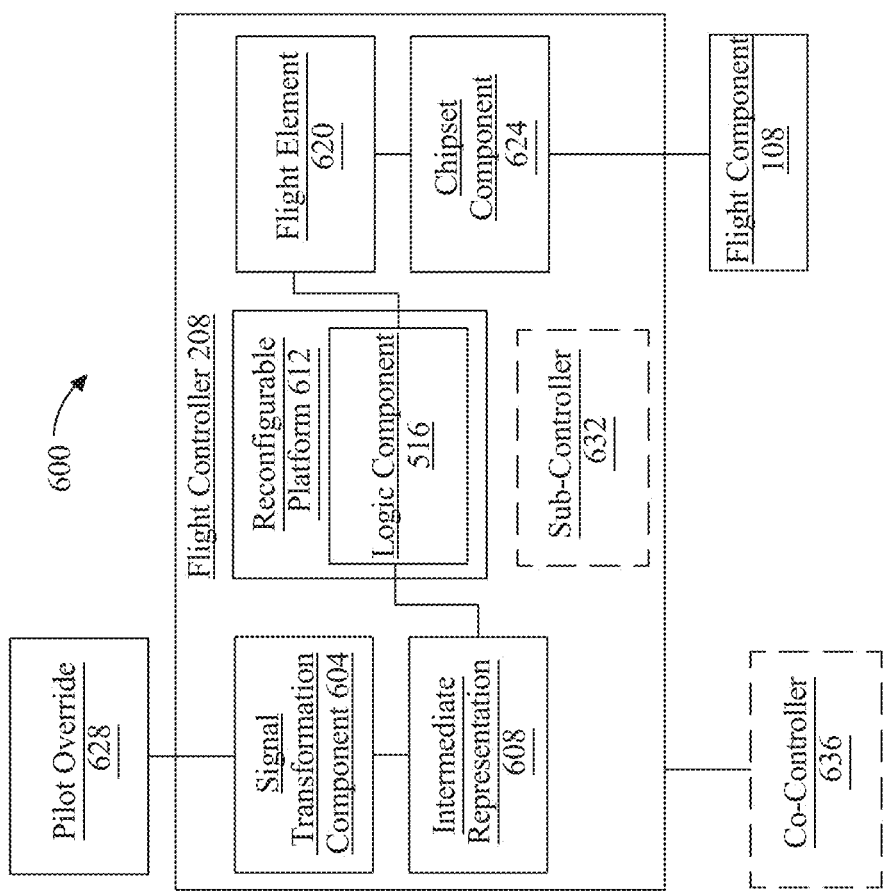
FIG. 6 is a block diagram of an exemplary embodiment of a flight controller.

Now referring to FIG. 6, an exemplary embodiment 600 of a possible computing device 208 is illustrated. Thus, a flight controller is illustrated. Flight controller may include and/or communicate with any computing device as described in this disclosure, including without limitation a microcontroller, microprocessor, digital signal processor (DSP) and/or system on a chip (SoC) as described in this disclosure. Further, flight controller may include a single computing device operating independently, or may include two or more computing device operating in concert, in parallel, sequentially or the like; two or more computing devices may be included together in a single computing device or in two or more computing devices. In embodiments, flight controller may be installed in an aircraft, may control the aircraft remotely, and/or may include an element installed in aircraft and a remote element in communication therewith.

In an embodiment, and still referring to FIG. 6, flight controller may include a signal transformation component 608. As used in this disclosure a "signal transformation component" is a component that transforms and/or converts a first signal to a second signal, wherein a signal may include one or more digital and/or analog signals. For example, and without limitation, signal transformation component 608 may be configured to perform one or more operations such as preprocessing, lexical analysis, parsing, semantic analysis, and the like thereof. In an embodiment, and without limitation, signal transformation component 608 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 608 may include transforming one or more low-level languages such as, but not limited to, machine languages and/or assembly languages. For example, and without limitation, signal transformation component 608 may include transforming a binary language signal to an assembly language signal. In an embodiment, and without limitation, signal transformation component 608 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 6, signal transformation component 608 may be configured to optimize an intermediate representation 612. As used in this disclosure an "intermediate representation" is a data structure and/or code that represents the input signal. Signal transformation component 608 may optimize intermediate representation as a function of a dataflow analysis, dependence analysis, alias analysis, pointer analysis, escape analysis, and the like thereof. In an embodiment, and without limitation, signal transformation component 608 may optimize intermediate representation 612 as a function of one or more inline expansions, dead code eliminations, constant propagation, loop transformations, and/or automatic parallelization functions. In another embodiment, signal transformation component 608 may optimize intermediate representation as a function of a machine dependent optimization such as a peephole optimization, wherein a peephole optimization may rewrite short sequences of code into more efficient sequences of code. Signal transformation component 608 may optimize intermediate representation to generate an output language, wherein an "output language," as used herein, is the native machine language of flight controller. For example, and without limitation, native machine language may include one or more binary and/or numerical languages.

In an embodiment, and without limitation, signal transformation component 608 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 6, flight controller may include a reconfigurable hardware platform 616. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 616 may be reconfigured to enact any algorithm and/or algorithm selection process received from another computing device and/or created using machine-learning processes.

Still referring to FIG. 6, reconfigurable hardware platform 616 may include a logic component 620. As used in this disclosure a "logic component" is a component that executes instructions on output language. For example, and without limitation, logic component may perform basic arithmetic, logic, controlling, input/output operations, and the like thereof. Logic component 620 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 620 may be organized according to Von Neumann and/or Harvard architecture as a non-limiting example. Logic component 620 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 620 may include one or more integrated circuit microprocessors, which may contain one or more central processing units, central processors, and/or main processors, on a single metal-oxide-semiconductor chip. Logic component 620 may be configured to execute a sequence of stored instructions to be performed on the output language and/or intermediate representation 612. Logic component 620 may be configured to fetch and/or retrieve the instruction from a memory cache, wherein a "memory cache," as used in this disclosure, is a stored instruction set on flight controller. Logic component 620 may be configured to decode the instruction retrieved from the memory cache to opcodes and/or operands. Logic component 620 may be configured to execute the instruction on intermediate representation 612 and/or output language. For example, and without limitation, logic component 620 may be configured to execute an addition operation on intermediate representation 612 and/or output language.

With continued reference to FIG. 6, in an embodiment, and without limitation, logic component 620 may be configured to calculate a flight element 624. As used in this disclosure a "flight element" is an element of datum denoting a relative status of aircraft. For example, and without limitation, flight element 624 may denote one or more torques, thrusts, airspeed velocities, forces, altitudes, groundspeed velocities, directions during flight, directions facing, forces, orientations, and the like thereof. For example, and without limitation, flight element 624 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 624 may denote that aircraft is following a flight path accurately and/or sufficiently.

Still referring to FIG. 6, flight controller may include a chipset component 628. As used in this disclosure a "chipset component" is a component that manages data flow. In an embodiment, and without limitation, chipset component 628 may include a northbridge data flow path, wherein the northbridge dataflow path may manage data flow from logic component 620 to a high-speed device and/or component, such as a RAM, graphics controller, and the like thereof. In another embodiment, and without limitation, chipset component 628 may include a southbridge data flow path, wherein the southbridge dataflow path may manage data flow from logic component 620 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally or alternatively, chipset component 628 may manage data flow between logic component 620, memory cache, and a flight component 108. As used in this disclosure a "flight component" is a portion of an aircraft that can be moved or adjusted to affect one or more flight elements. For example, flight component 108 may include a component used to affect the aircrafts' roll and pitch which may include one or more ailerons. As a further example, flight component 108 may include a rudder to control yaw of an aircraft. In an embodiment, chipset component 628 may be configured to communicate with a plurality of flight components as a function of flight element 624. For example, and without limitation, chipset component 628 may transmit to an aircraft rotor to reduce torque of a first lift propulsor and increase the forward thrust produced by a pusher component to perform a flight maneuver.

In an embodiment, and still referring to FIG. 6, flight controller is configured to produce both autonomous and semi-autonomous flight. As used in this disclosure an "autonomous function" is a mode and/or function of flight controller that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 624. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller will control the ailerons and/or rudders. As used in this disclosure "non-autonomous mode" is a mode that denotes a pilot will control aircraft and/or maneuvers of aircraft in its entirety.

In an embodiment, and still referring to FIG. 6, flight controller may generate autonomous function as a function of an autonomous machine-learning model. Training data is used to train autonomous machine-learning model; training data may be stored in a database or based on expert input. Training data may include an input of the charge of the batteries and an output of whether they need to be charged. As used in this disclosure an "autonomous machine-learning model" is a machine-learning model to produce an autonomous function output given flight element 624 and a pilot signal 636 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 636 may denote that a pilot is controlling and/or maneuvering ailerons, wherein the pilot is not in control of the rudders and/or propulsors. In an embodiment, pilot signal 636 may include an implicit signal and/or an explicit signal. For example, and without limitation, pilot signal 636 may include an explicit signal, wherein the pilot explicitly states there is a lack of control and/or desire for autonomous function. As a further non-limiting example, pilot signal 636 may include an explicit signal directing flight controller to control and/or maintain a portion of aircraft, a portion of the flight plan, the entire aircraft, and/or the entire flight plan. As a further non-limiting example, pilot signal 636 may include an implicit signal, wherein flight controller detects a lack of control such as by a malfunction, torque alteration, flight path deviation, and the like thereof. In an embodiment, and without limitation, pilot signal 636 may include one or more explicit signals to reduce torque, and/or one or more implicit signals that torque may be reduced due to reduction of airspeed velocity. In an embodiment, and without limitation, pilot signal 636 may include one or more local and/or global signals. For example, and without limitation, pilot signal 636 may include a local signal that is transmitted by a pilot and/or crew member. As a further non-limiting example, pilot signal 636 may include a global signal that is transmitted by air traffic control and/or one or more remote users that are in communication with the pilot of aircraft. In an embodiment, pilot signal 636 may be received as a function of a tri-state bus and/or multiplexor that denotes an explicit pilot signal should be transmitted prior to any implicit or global pilot signal.

Still referring to FIG. 6, autonomous machine-learning model may include one or more autonomous machine-learning processes such as supervised, unsupervised, or reinforcement machine-learning processes that flight controller and/or a remote device may or may not use in the generation of autonomous function. Additionally or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elastic net regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 6, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 6, flight controller may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller. Remote device and/or FPGA may transmit a signal, bit, datum, or parameter to flight controller that at least relates to autonomous function. Additionally or alternatively, the remote device and/or FPGA may provide an updated machine-learning model. For example, and without limitation, an updated machine-learning model may be included of a firmware update, a software update, an autonomous machine-learning process correction, and the like thereof. As a non-limiting example a software update may incorporate a new simulation data that relates to a modified flight element. Additionally or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 6, flight controller may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 6, flight controller may include, but is not limited to, for example, a cluster of flight controllers in a first location and a second flight controller or cluster of flight controllers in a second location. Flight controller may include one or more flight controllers dedicated to data storage, security, distribution of traffic for load balancing, and the like. Flight controller may be configured to distribute one or more computing tasks as described below across a plurality of flight controllers, which may operate in parallel, in series, redundantly, or in any other manner used for distribution of tasks or memory between computing devices. For example, and without limitation, flight controller may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Massachusetts, USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 6, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 108. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further includes separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 6, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 612 and/or output language from logic component 620, wherein output language may include one or more analog-to-digital conversions, low bit rate transmissions, message encryptions, digital signals, binary signals, logic signals, analog signals, and the like thereof described above in detail.

Still referring to FIG. 6, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 6, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 6, flight controller may also be implemented using a "shared nothing" architecture in which data is cached at the worker, in an embodiment, this may enable scalability of aircraft and/or computing device. Flight controller may include a distributer flight controller. As used in this disclosure a "distributer flight controller" is a component that adjusts and/or controls a plurality of flight components as a function of a plurality of flight controllers. For example, distributer flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 6, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function $\phi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 6, flight controller may include a sub-controller 640. As used in this disclosure a "sub-controller" is a controller and/or component that is part of a distributed controller as described above; for instance, flight controller may be and/or include a distributed flight controller made up of one or more sub-controllers. For example, and without limitation, sub-controller 640 may include any controllers and/or components thereof that are similar to distributed flight controller and/or flight controller as described above. Sub-controller 640 may include any component of any flight controller as described above. Sub-controller 640 may be implemented in any manner suitable for implementation of a flight controller as described above. As a further non-limiting example, sub-controller 640 may include one or more processors, logic components and/or computing devices capable of receiving, processing, and/or transmitting data across the distributed flight controller as described above. As a further non-limiting example, sub-controller 640 may include a controller that receives a signal from a first flight controller and/or first distributed flight controller component and transmits the signal to a plurality of additional sub-controllers and/or flight components.

Still referring to FIG. 6, flight controller may include a co-controller 644. As used in this disclosure a "co-controller" is a controller and/or component that joins flight controller as components and/or nodes of a distributer flight controller as described above. For example, and without limitation, co-controller 644 may include one or more controllers and/or components that are similar to flight controller. As a further non-limiting example, co-controller 644 may include any controller and/or component that joins flight controller to distributer flight controller. As a further non-limiting example, co-controller 644 may include one or more processors, logic components and/or computing devices capable of receiving, processing, and/or transmitting data to and/or from flight controller to distributed flight control system. Co-controller 644 may include any component of any flight controller as described above. Co-controller 644 may be implemented in any manner suitable for implementation of a flight controller as described above.

In an embodiment, and with continued reference to FIG. 6, flight controller may be designed and/or configured to perform any method, method step, or sequence of method steps in any embodiment described in this disclosure, in any order and with any degree of repetition. For instance, flight controller may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 7:
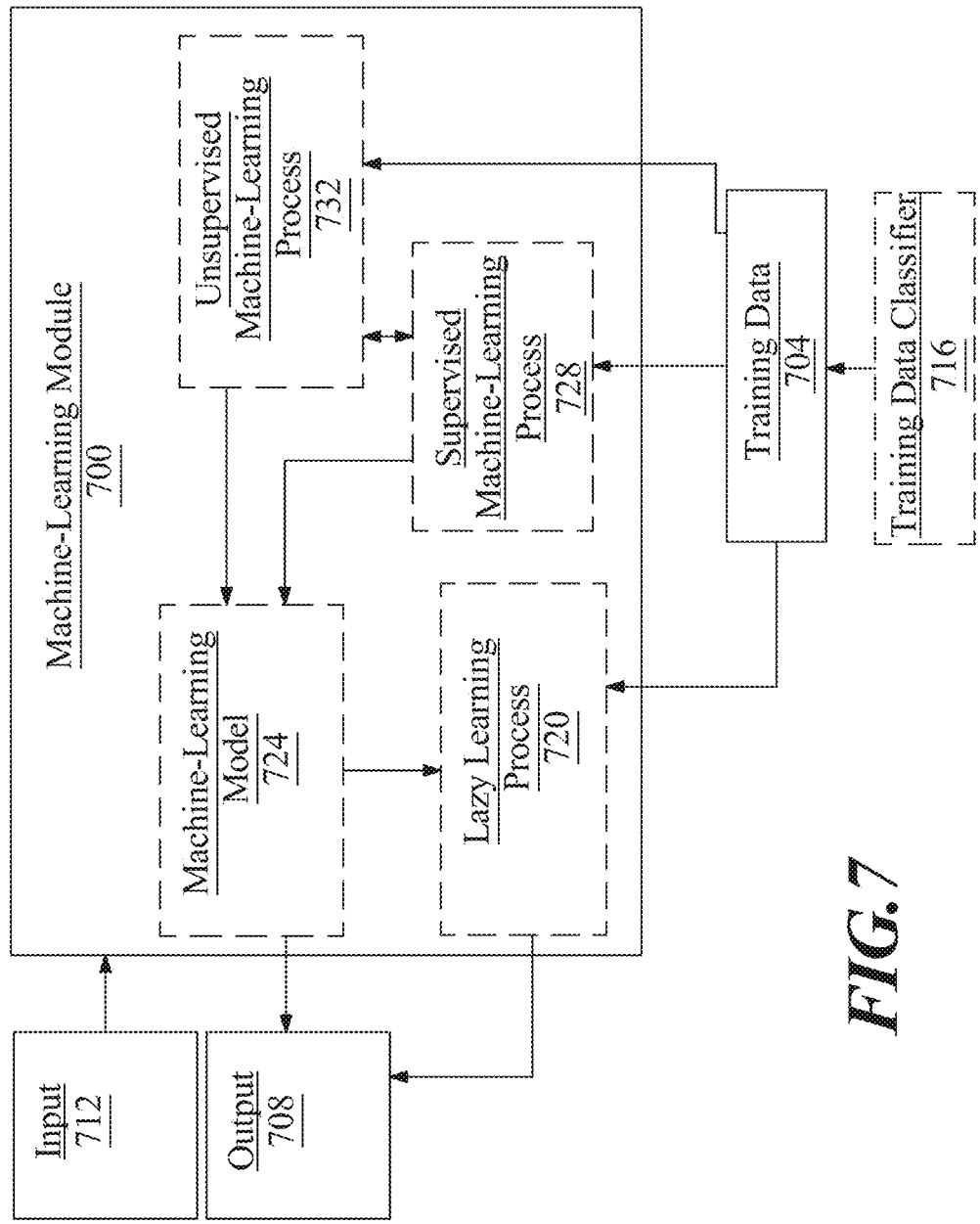
FIG. 7 is a block diagram of an exemplary embodiment of a machine-learning module.

Referring now to FIG. 7, an exemplary embodiment of a machine-learning module 700 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 704 to generate an algorithm that will be performed by a computing device/module to produce outputs 708 given data provided as inputs 712; this is in contrast to a non-machine learning software program where the commands to be executed are determined in advance by a user and written in a programming language.

Still referring to FIG. 7, "training data," as used herein, is data containing correlations that a machine-learning process may use to model relationships between two or more categories of data elements. For instance, and without limitation, training data 704 may include a plurality of data entries, each entry representing a set of data elements that were recorded, received, and/or generated together; data elements may be correlated by shared existence in a given data entry, by proximity in a given data entry, or the like. Multiple data entries in training data 704 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 704 according to various correlations; correlations may indicate causative and/or predictive links between categories of data elements, which may be modeled as relationships such as mathematical relationships by machine-learning processes as described in further detail below. Training data 704 may be formatted and/or organized by categories of data elements, for instance by associating data elements with one or more descriptors corresponding to categories of data elements. As a non-limiting example, training data 704 may include data entered in standardized forms by persons or processes, such that entry of a given data element in a given field in a form may be mapped to one or more descriptors of categories. Elements in training data 704 may be linked to descriptors of categories by tags, tokens, or other data elements; for instance, and without limitation, training data 704 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 7, training data 704 may include one or more elements that are not categorized; that is, training data 704 may not be formatted or contain descriptors for some elements of data. Machine-learning algorithms and/or other processes may sort training data 704 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 704 to be made applicable for two or more distinct machine-learning algorithms as described in further detail below. Training data 704 used by machine-learning module 700 may correlate any input data as described in this disclosure to any output data as described in this disclosure. As a non-limiting illustrative example flight elements and/or pilot signals may be inputs, wherein an output may be an autonomous function.

Further referring to FIG. 7, training data may be filtered, sorted, and/or selected using one or more supervised and/or unsupervised machine-learning processes and/or models as described in further detail below; such models may include without limitation a training data classifier 716. Training data classifier 716 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 700 may generate a classifier using a classification algorithm, defined as a processes whereby a computing device and/or any module and/or component operating thereon derives a classifier from training data 704. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 716 may classify elements of training data to sub-categories of flight elements such as torques, forces, thrusts, directions, and the like thereof.

Still referring to FIG. 7, machine-learning module 700 may be configured to perform a lazy-learning process 720 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 704. Heuristic may include selecting some number of highest-ranking associations and/or training data 704 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 7, machine-learning processes as described in this disclosure may be used to generate machine-learning models 724. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 724 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 724 may be generated by creating an artificial neural network, such as a convolutional neural network comprising an input layer of nodes, one or more intermediate layers, and an output layer of nodes. Connections between nodes may be created via the process of "training" the network, in which elements from a training data 704 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 7, machine-learning algorithms may include at least a supervised machine-learning process 728. At least a supervised machine-learning process 728, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 704. Persons skilled in the art, upon reviewing the entirety of this disclosure, will be aware of various possible variations of at least a supervised machine-learning process 728 that may be used to determine relation between inputs and outputs. Supervised machine-learning processes may include classification algorithms as defined above.

Further referring to FIG. 7, machine learning processes may include at least an unsupervised machine-learning processes 732. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 7, machine-learning module 700 may be designed and configured to create a machine-learning model 724 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 7, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 8:
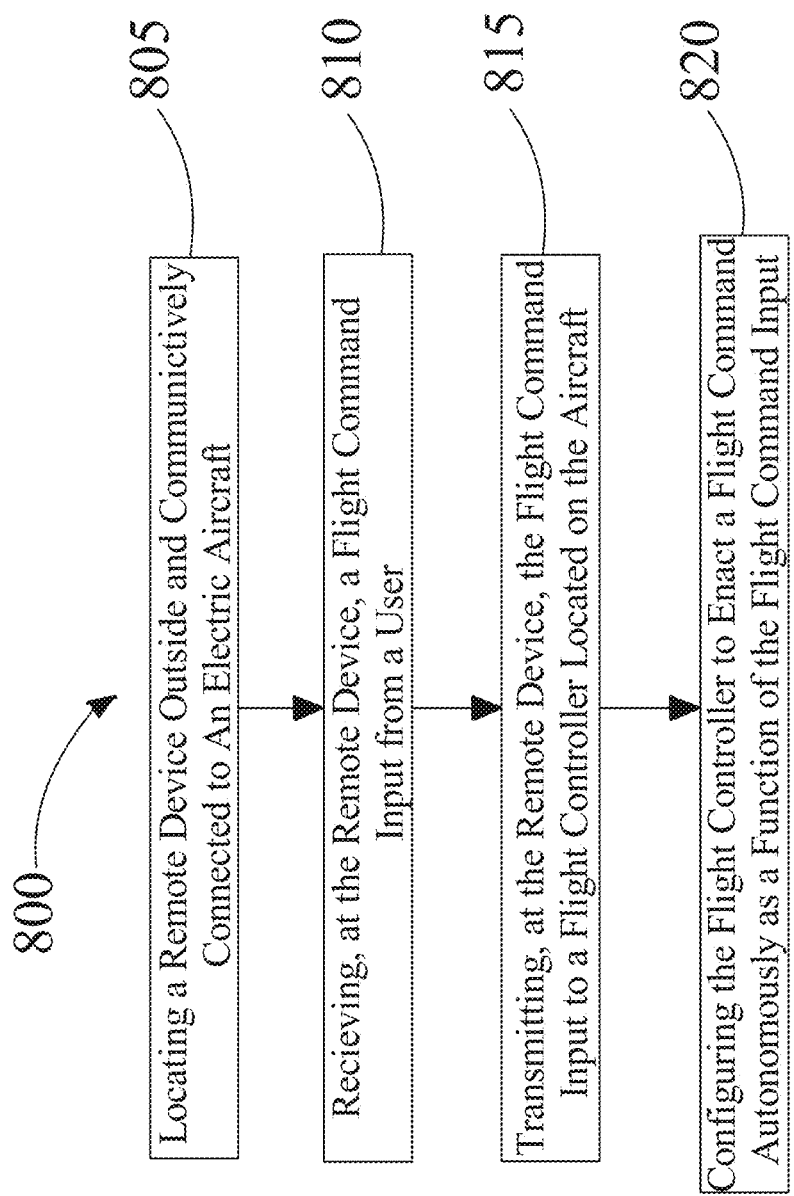
FIG. 8 is a flow diagram of an exemplary embodiment of a method for remote piloting of an electric aircraft.

Now referring to FIG. 8, an exemplary embodiment of a method 800 for the remote piloting of an electric aircraft is presented. The electric aircraft may include, but without limitation, any of the aircraft as disclosed herein and described above with reference to at least FIG. 1.

Still referring to FIG. 8, at step 805, method 800 includes locating a remote device outside an electric aircraft. Remote device includes a computing device. Remote device may include, but without limitation, any of the devices as disclosed herein and described above with reference to at least FIGS. 2 and 6. The electric aircraft may include, but without limitation, any of the aircraft as disclosed herein and described above with reference to at least FIG. 1. System further comprising a predictive simulation of an aircraft response to the flight command input.

Still referring to FIG. 8, at step 810, method 800 includes receiving, at the remote device, a flight command input from a user. Flight command input includes an altitude adjustment. Flight command input includes a change of flight mode. Remote device may include, but without limitation, any of the devices as disclosed herein and described above with reference to at least FIGS. 2 and 6. Flight command input may include, but without limitation, any of the command inputs as disclosed herein and described above with reference to at least FIG. 2. User may include, but without limitation, any of the users as disclosed herein and described above with reference to at least FIG. 2.

Still referring to FIG. 8, at step 815, method 800 includes transmitting, at the remote device, the flight command input to a flight controller located on the aircraft. Flight controller is further configured to identify a location of the electric aircraft. Flight controller is further configured to generate the flight command as a function of the flight command input before enacting it. Remote device may include, but without limitation, any of the devices as disclosed herein and described above with reference to at least FIGS. 2 and 6. Flight command input may include, but without limitation, any of the command inputs as disclosed herein and described above with reference to at least FIG. 2. Flight controller may include, but without limitation, any of the flight controllers as disclosed herein and described above with reference to at least FIGS. 2-3.

Still referring to FIG. 8, at step 820, method 800 includes configuring the flight controller to enact a flight command autonomously as a function of the flight command input. Remote device includes a pilot input control. Remote device includes a display configured to display, to the user, a pilot view of the electric aircraft. Remote device includes a flight simulator, wherein the flight simulator is configured to receive at least a sensor input from the flight controller and simulate flight of the electric aircraft as a function of the at least a sensor input. Flight controller may include, but without limitation, any of the flight controllers as disclosed herein and described above with reference to at least FIGS. 2-3. Flight command input may include, but without limitation, any of the command inputs as disclosed herein and described above with reference to at least FIG. 2.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
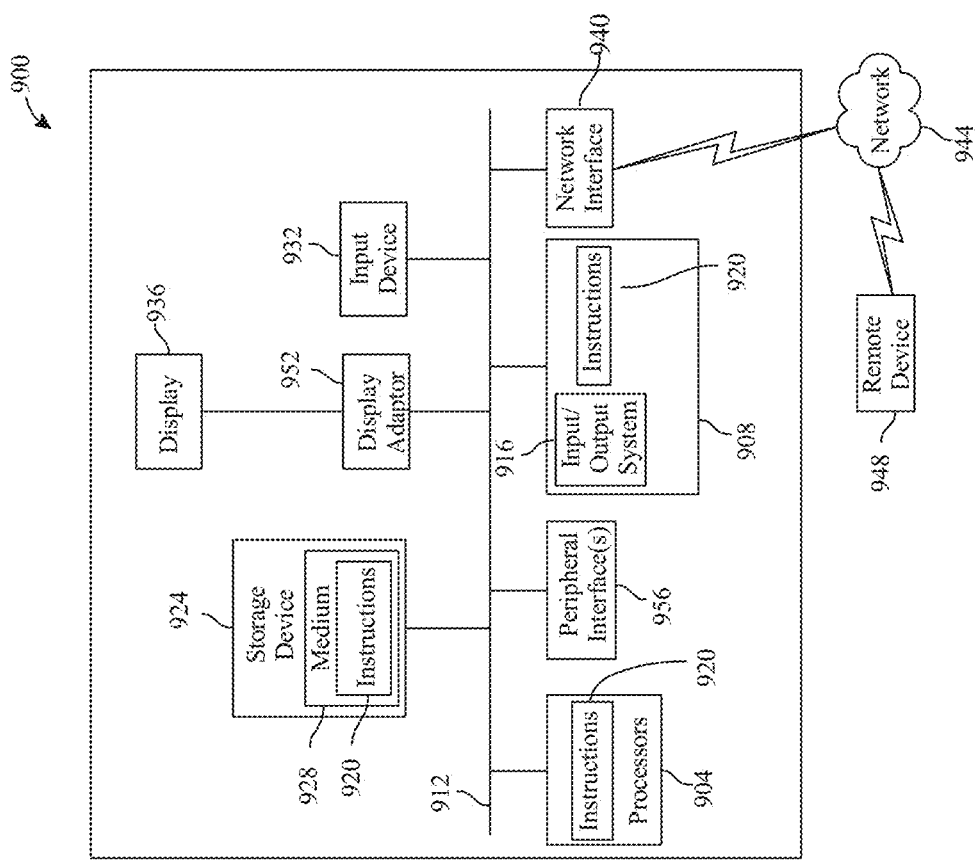
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve systems and methods according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for remote piloting of an aircraft, the system comprising:
a remote device located outside and communicatively connected to the aircraft, wherein:
the remote device comprises a pilot input configured to receive a flight command input from a user; and
the remote device is configured to:
transmit the flight command input to a flight controller located on the aircraft, wherein flight command input configures the flight controller to enact a flight command autonomously based on the flight command input, and wherein enacting the flight command autonomously based on the flight command input comprises:
providing input data determined based on the flight command input to a machine learning model,
receiving the flight command from the machine learning model, and
controlling the aircraft based on the flight command; and
receive sensor input from the flight controller.

2. The system of claim 1, wherein the sensor input comprises flight component specific data.

3. The system of claim 2, wherein the remote device comprises a display configured to display, to the user, the flight component specific data.

4. The system of claim 2, wherein enacting the flight command comprises applying the flight command input to a flight component.

5. The system of claim 1, wherein enacting the flight command comprises:
changing from a first method of flying the aircraft to a second method of flying the aircraft, wherein:
the first method of flying the aircraft comprises a rotor-based flight; and the second method of flying the aircraft comprises a fixed wing flight.

6. The system of claim 1, wherein the flight command input comprises an altitude adjustment.

7. The system of claim 6, wherein enacting the flight command comprises:
adjusting an altitude of the aircraft based on the altitude adjustment.

8. The system of claim 1, wherein the flight controller is further configured to identify a location of the aircraft.

9. The system of claim 1, wherein the flight controller is further configured to generate the flight command based on the flight command input before enacting it.

10. The system of claim 1, wherein the remote device is further configured to:
generate a simulation of the aircraft based on the flight command input, wherein generating the simulation of the aircraft comprises:
generating an aircraft model, wherein the aircraft model comprises sensor model.

11. The system of claim 1, wherein the input data is further determined based on a state of the aircraft and data generated based on simulating an operation of the aircraft.

12. A method for remote piloting of an aircraft (eVTOL), the method comprising:
locating a remote device outside and communicatively connected to the aircraft, wherein the remote device comprises pilot input configured to receive a flight command input from a user;
transmitting, at a remote device, the flight command input to a flight controller located on the aircraft, wherein flight command input configures the flight controller to enact a flight command autonomously based on the flight command input, and wherein enacting the flight command autonomously based on the flight command input comprises:
providing input data determined based on the flight command input to a machine learning model,
receiving the flight command from the machine learning model, and
controlling the aircraft based on the flight command; and
receive, from the flight controller, sensor input.

13. The method of claim 12, wherein the sensor input comprises flight component specific data.

14. The method of claim 13, wherein the remote device comprises a display configured to display, to the user, the flight component specific data.

15. The method of claim 13, wherein enacting the flight command comprises applying the flight command input to a flight component.

16. The method of claim 12, wherein enacting the flight command comprises: changing from a first method of flying the aircraft to a second method of flying the aircraft, wherein:
the first method of flying the aircraft comprises a rotor-based flight; and
the second method of flying the aircraft comprises a fixed wing flight.

17. The method of claim 12, wherein the flight command input comprises an altitude adjustment.

18. The method of claim 17, wherein enacting the flight command comprises: adjusting an altitude of the aircraft based on the altitude adjustment.

19. The method of claim 12, wherein the flight controller is further configured to generate the flight command based on the flight command input before enacting it.

20. The method of claim 12, wherein the method further comprises:
generating, using the remote device, a simulation of the aircraft based on the flight command input, wherein generating the simulation of the aircraft comprises:
generating, using the remote device, an aircraft model, wherein the aircraft model comprises sensor model.

* * * * *